United States Patent [19]

Grasso et al.

[11] Patent Number: 4,989,754
[45] Date of Patent: Feb. 5, 1991

[54] TONER LEVEL DETECTION SYSTEM

[75] Inventors: Patrick J. Grasso; John L. Webb, both of Fairport; Glen A. Woodhams, Rochester; Michael A. Kelly, Walworth, all of N.Y.

[73] Assignee: Xerox Corporation, Stamford, Conn.

[21] Appl. No.: 445,071

[22] Filed: Nov. 30, 1989

[51] Int. Cl.[5] .............................................. B67D 5/08
[52] U.S. Cl. ..................................... 222/39; 222/66; 222/167; 222/325; 222/DIG. 1
[58] Field of Search ........................ 222/39, 23, 64, 63, 222/66, 47, 48, 51, 167, 169, 478, 500, 325, DIG. 1; 73/290 R; 340/612, 615, 617; 355/245, 246, 260

[56] References Cited

U.S. PATENT DOCUMENTS

| | | | |
|---|---|---|---|
| 3,920,155 | 11/1975 | Whited | 222/23 |
| 3,979,022 | 9/1976 | Whited | 222/23 |
| 4,690,540 | 9/1987 | Manno | 355/3 |

OTHER PUBLICATIONS

Xerox Disclosure Journal, vol. 5, No. 1, Jan./Feb. 1980.

Primary Examiner—Andres Kashnikow
Assistant Examiner—Philippe Derakshani

[57] ABSTRACT

A toner cartridge is modified by the addition of a low toner sensing mechanism internal to the cartridge. An arm is pivotably mounted within the cartridge; the suspended end of the arm having a magnet secured thereto. When the cartridge is filled to a relatively high level with toner and rotated, the suspended arm is at least partially submerged in the toner bed and is subjected to a viscous drag force which moves the arm from the vertical position and prevents the arm from returning to the vertical or plumb orientation until a sufficiently low toner level occurs. At this point the arm is sufficiently free from the viscous drag effects of the rotating toner bed and attains a plumb position which brings it into alignment with a switching circuit which is closed by action of the proximate magnet. The switching circuitry generates signals which are used to produce a visible or audible signal to the operator, and/or which cause machine shut down to occur.

8 Claims, 4 Drawing Sheets

TONER LEVEL DETECTION SYSTEM

BACKGROUND AND INFORMATION DISCLOSURE STATEMENT

This invention relates to toner dispensers for electrophotographic copiers and duplicators and, more particularly to a low toner detection and indicating system for warning a machine operator of impending exhaustion of the toner supply.

In the process of electrostatographic printing, an electrostatic charge pattern or latent image corresponding to an original document to be reproduced is recorded on an insulating medium. A viewable record is produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles (simply "toner" hereafter) must be supplied. In this way, the concentration of toner in the developer mix is maintained substantially constant.

In the operation of an electrophotographic copier or printer, it is highly desirable to have means for indicating when the supply of toner in the dispensing apparatus has become exhausted. When the supply of toner finally nears exhaustion, there may be a perceptible reduction in the density of the developed image and, therefore, a corresponding degradation in copy quality, e.g., unacceptable light copy. This latter condition is usually the first indication to an operator that the toner supply is in need of replenishment. Upon installation of a new toner supply in the form of a toner cartridge, and upon continued resumption of copying, the output copies will still be light because of the continued low toner concentration. To recover from this detoned condition, under normal dispensing, may take several days. For copiers which reproduce large documents such as the Xerox 2510, the machine, without corrective action, will never fully recover. The remedy, at this point, is to add fresh toner to the developer mix to increase the toner concentration to the required level before resuming operation. Typically, this is achieved by manually rotating an installed dispenser cartridge until the desired concentration level is reached.

It is, therefore, apparent that an early warning of impending toner exhaustion would be desirable so that toner could be replenished before being totally exhausted. Toner replacement could then be implemented at a time while the toner concentration is still at acceptable levels. There have been several approaches in the prior art to provide this low toner level sensing indication. U.S. Pat. No. 4,135,642, assigned to the same assignee as the present invention, illustrates a technique whereby an opposed lamp and photocell are located at the bottom of a toner dispensing housing. When the toner level drops to a sufficiently low point, an electrical signal is produced at the photocell which can be used to generate a visual or audible indication of low toner. A publication entitled "Toner Level Sensor", published in the Xerox Disclosure Journal, Vol. 5, No. 1, Jan./Feb. 1980, discloses a float type sensor which rides onthe toner bed within the cartridge and provides an indication, on a calibrated display, of low toner level.

Other toner art methods utilized a mechanism which is internal to the toner dispenser housing and which interacts in some manner with the toner supply. The mechanism is coupled electrically or magnetically to an electrical circuit located adjacent to, but outside of the housing. U.S. Pat. No. 3,920,155, assigned to the same assignee as the present invention discloses a sensing means 114. The housing is oscillated to dispense toner through output ports; the sensing mean extends into the toner bed and is oscillated at the same rate as the housing. When the toner level drops below a specified point, the sensing mechanism becomes free of contact with the toner and begins oscillating at a rate different than that of the housing. A detecting means exterior to the housing, is located so as to detect the different oscillation rates of the housing and the sensing mechanism and generates a signal indicating a low toner level. U.S. Pat. No. 3,979,012, also assigned to the same assignee as the present invention, discloses another low level sensing system which uses a longitudinally installed shaft member with magnetic paddles protruding through the ends. The paddles extend into the toner bed and rotate therewith until the toner drops below a certain point. At that time, the paddles come under the influence of magnets located in the interior sides of the housing and rotate to a position where a switch is closed producing a low toner signal.

The present invention is directed to a low toner level sensing and indicator system which is relatively simple to install and to operate and requires the use of only a single magnet and a single magnetically enabled switch. More particularly, the invention relates to an apparatus for dispensing toner particles including, in combination, a cylindrical rotating toner housing have a plurality of longitudinal toner dispensing ports for a toner supply contained therein, an arm assembly pivotably mounted within the housing on the central axis thereof, said arm assembly including a downwardly extending arm member which attains a plumb position when the toner level falls below a certain low level while maintaining an out of plumb position when toner is above said low level; magnetic means connected to said arm member, said magnetic means enabling a magnetic sensing circuit aligned with said magnetic means when said arm member is in the plumb position.

IN THE DRAWINGS

Figure 1:
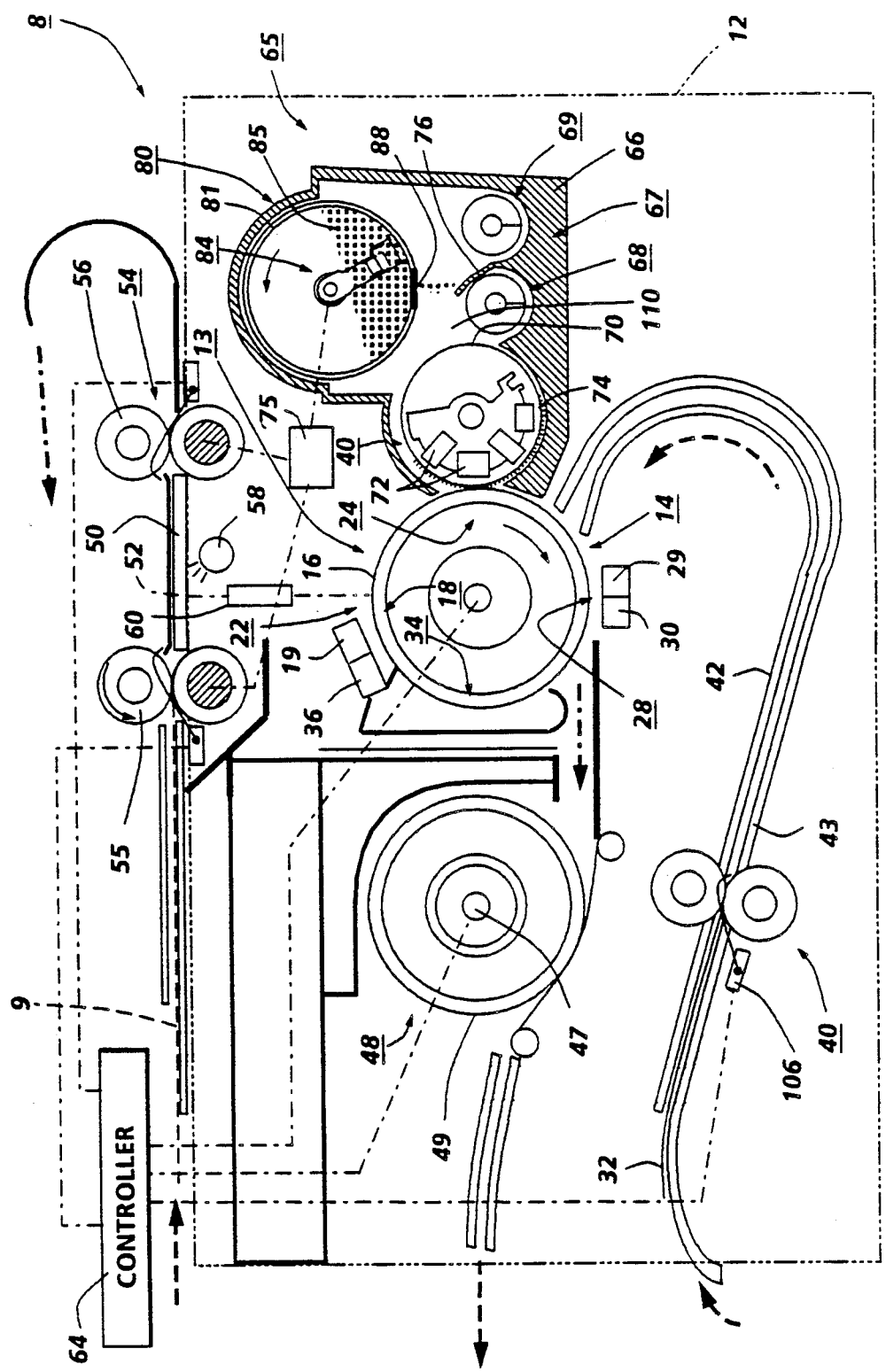
FIG. 1 is a side view, in section, of a document reproduction machine incorporating the low toner level sensor of the present invention.

Referring to FIG. 1 of the drawings, there is shown a xerographic type reproduction machine 8. Machine 8 has a suitable frame 12 on which the machine xerographic components are operatively supported. Briefly, and as will be familiar to those skilled in the art, the machine xerographic components include a recording member, shown here in the form of a rotatable photoreceptor 14. In the exemplary arrangement shown, photoreceptor 14 comprises a drum having a photoconductive surface 16. Operatively disposed about he periphery of a photoreceptor 14 are charge station 18 with charge corotron 19 for placing a uniform charge on the photoconductive surface of photoreceptor 14, exposure station 22 where the previously charged photoconductive surface 16 is exposed to image rays of the document 9 being copied or reproduced, development station 24 where the latent electrostatic image created on photoconductive surface 16 is developed by toner, transfer station 28 with transfer corotrons 29, 30 for transferring the developed image to a suitable copy substrate material such as a copy sheet 32 brought forward in timed relation with the developed image on photoconductive surface 16, and cleaning station 34 with cleaning blade 35 and discharge corotron 36 for removing leftover developer from photoconductive surface 16 and neutralizing residual charges thereon.

Copy sheets 32 are brought forward to transfer station 28 by feed roll pair 40, sheet guides 42, 43 serving to guide the sheet through an approximately 180° turn prior to transfer station 28. Following transfer, the sheet 32 is carried forward to a fusing station 48 where the toner image is fixed by fusing roll 49. Fusing roll 49 is heated by a suitable heater such as lamp 47 disposed within the interior of roll 49, after fixing, the copy sheet 32 is discharged.

A transparent platen 50 supports the document 9 as the document is moved past a scan point 52 by a constant velocity type transport 54. As will be understood, scan point 52 is in effect a scan line extending across the width of latent 50 at a desired point along platen 50 where the document is scanned line by line as the document is moved along platen 50 by transport 54. Transport 54 has input and output document feed roll pairs 55, 56, respectively, on each side of scan point 52 for moving document 9 across platen 50 at a predetermined speed. Exposure lamp 58 is provided to illuminate a strip-like area of platen 50 at scan point 52. The image rays from the document lines scanned are transmitted by a gradient index fiber lens array 60 to exposure station 22 to expose the photoconductive surface 16 of the moving photoreceptor 14. A controller 64 controls the operation and timing functions of the machine.

Developing station 24 includes a developer housing 65, the lower part of which forms a sump 66 for holding a quantity of developer 67. A pair of augers 68, 69 mix the developer and transfer it to the vicinity of the magnetic brush developer roll 70. As will be understood by those skilled in the art, developer 67 comprises a mixture of larger carrier particles and smaller toner or ink particles commonly referred to as two component developer, a or a unitary developer mixture commonly referred to as single component developer.

Magnetic brush developer roll 70 is disposed in predetermined operative relation to the photoconductive surface 16 of photoreceptor 14 in developer housing 65, the length of developing roll 70 being equal to or slightly greater than the width of photoconductive surface 16, with the axis of roll 70 paralleling the axis of photoreceptor 14.

Roller 70 has a plurality of magnets 72 which forms a developer brush 74 on its surface. The roller is thus adapted to convey the developer to the latent image on the drum surface. For further details of the developer system, the disclosure of U.S. Pat. No. 4,690,540 is hereby incorporated by reference.

Figure 2:
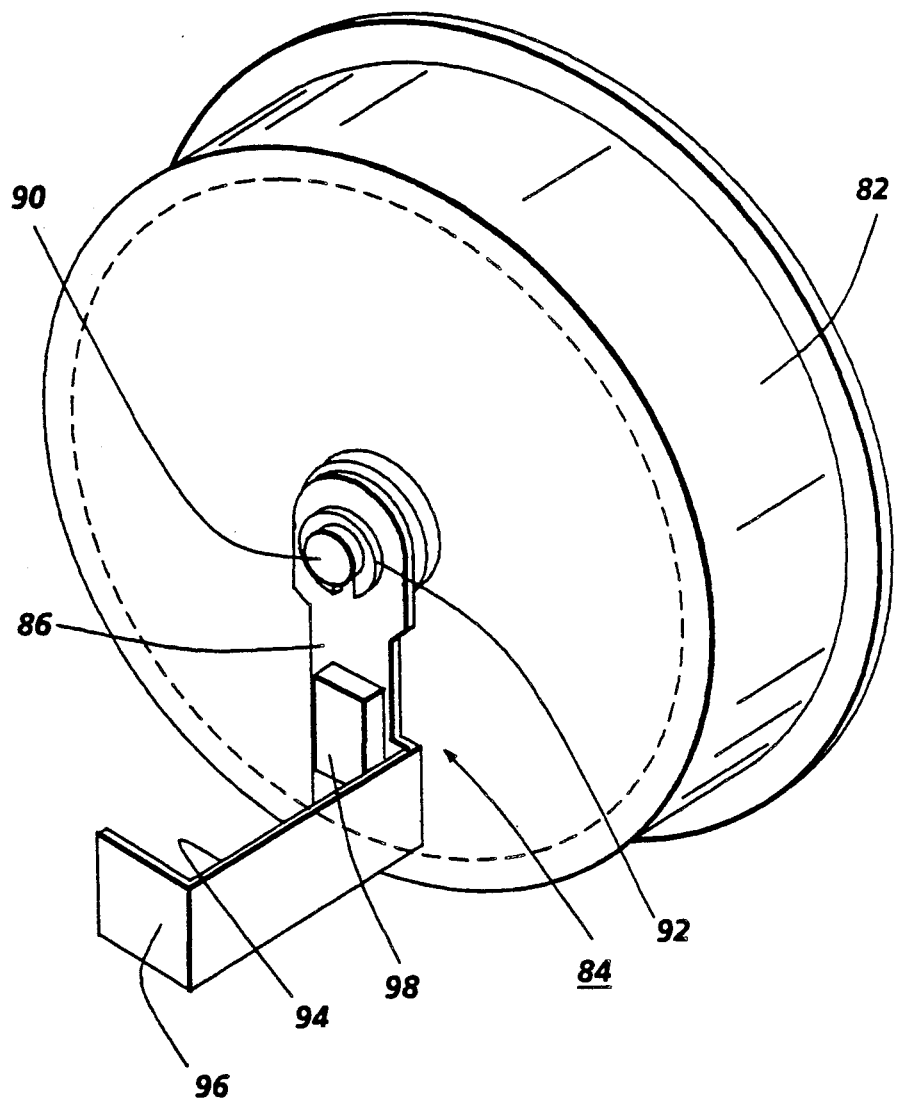
FIG. 2 is a schematic perspective view of the end portion of the FIG. 1 toner dispenser housing.
Figure 3:
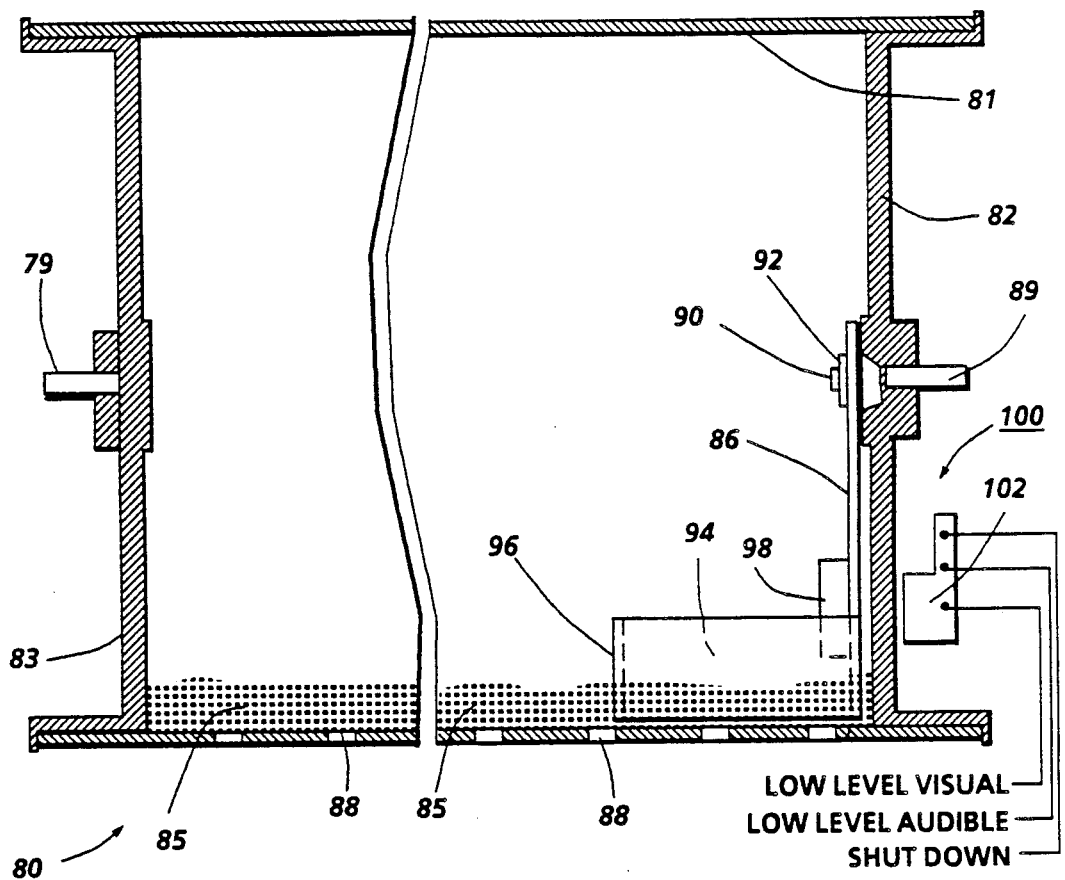
FIG. 3 is a side view of FIG. 2 view of the toner dispenser housing showing the mounting of the low toner level sensor and showing the adjacent low level switching arrangement.

Fresh toner is added to sump 66 by means of intermittently rotated toner dispensing cartridge 80 shown in partial side view in FIG. 3. The housing comprises a cylinder 81 sealed at both ends by end caps 82, 83 and supported at the ends for rotation. The cartridge is initially partially filled with the toner bed 85. The cylinder is rotated in a predetermined time sequence by means (not shown) attached to hub shaft 79, but which could be, for example, a cam and follower of the type disclosed in the U.S. Pat. No. 4,690,540. The toner is dispensed through a series of longitudinally extending ports 88, the toner exiting the cylinder when the ports are aligned approximately at the 6 o'clock position, as shown in FIG. 1. According to the present invention cartridge 80 further includes, as shown in FIGS. 2 and 3, an arm assembly 84 which is pivotably mounted on a central axis location onthe interior surface of end cap 82. Arm assembly 84 comprises a first generally rectangular arm member 86 having an aperture 88 therethrough through which extends pivot shaft 90 located through the central axis of the cartridge. Shaft 90 is part of end cap 82. Arm assembly 84 is held on shaft 90 by retainer 92. Arm assembly 84 further includes an L-shaped paddle member 94 extending at a right angle from arm 86 into the toner bed. L-shaped paddle member 94 in turn has a right angle portion 96 at the end thereof. The arm assembly 84 and L-shaped paddle 94 are of relatively light weight construction; in a preferred embodiment they are made of aluminum. A magnet 98 is attached to the in board side of arm 86.

FIG. 3 shows a view of a toner cartridge which has been newly installed in a machine and with no system power applied. Arm assembly 84 is initially in the vertical 6 o'clock or plumb position, and is almost entirely enveloped by the toner bed 85. Magnet 98, in this initial alignment, is in horizontal alignment with the magnetically activated switch device 100. Device 100 may incorporate a reed switch 102 which is horizontally aligned with magnet 98 only when arm assembly 84 is in the plumb position. Contacts from the switch 102 are designed to close a circuit when under the influence of the magnetic field from magnet 98. When the circuit is closed a number of output signals are generated for purposes discussed below. From the above description, and as will follow below, arm assembly 84 and switch device 100 cooperate to enable a low toner level sensing system which produces signals utilized to provide warning indications to an operator of a low toner condition.

Figure 4:
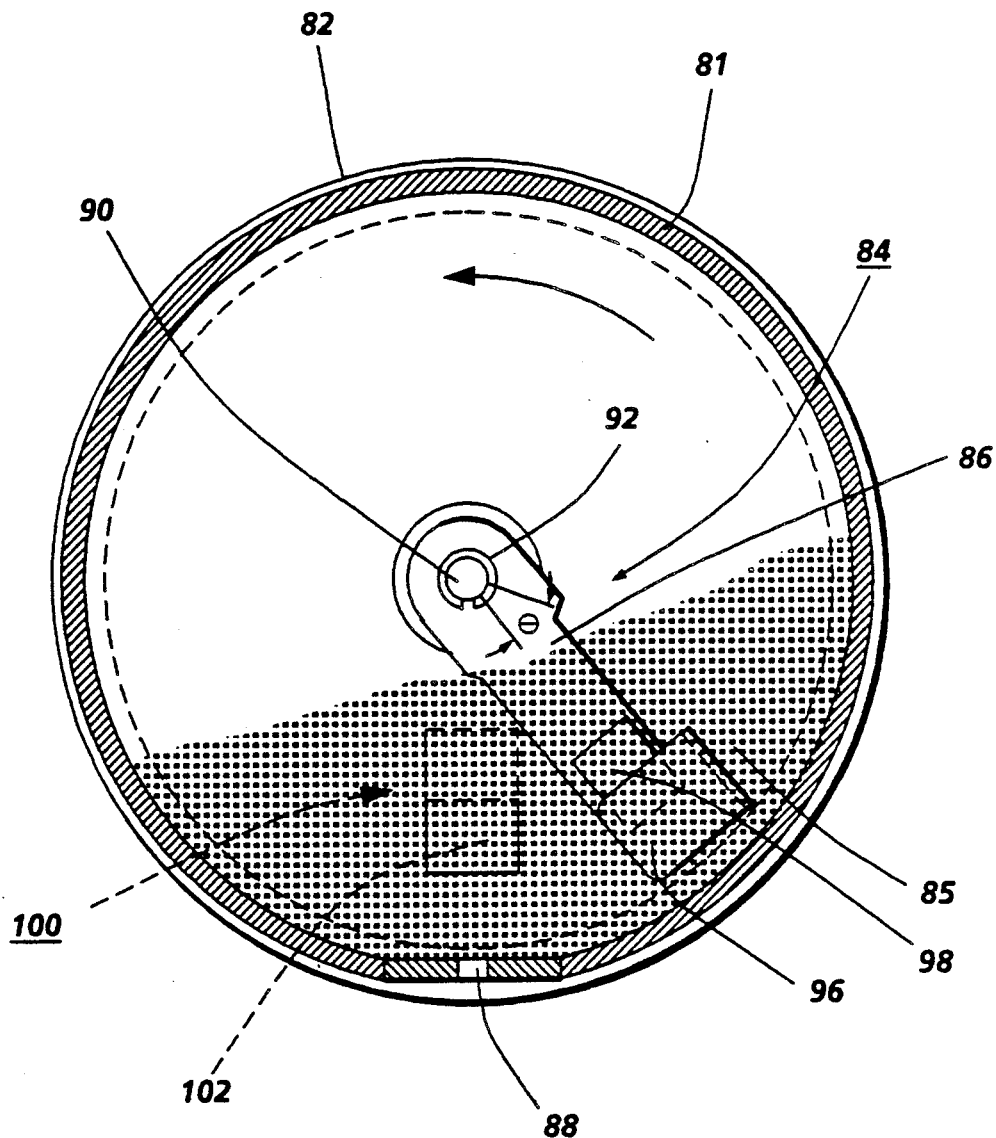

The operation of the low toner sensing system will now be described with reference to FIGS. 2-5. Upon installation of a new toner cartridge 80, the machine is turned on while the switch circuit 100 enablement is delayed for a short time by controller 64 until the cartridge rotates in the counterclockwise direction a short distance. FIG. 4 shows a relative position at this time of arm assembly 84 within toner bed 85, and of reed switch 102. The toner bed 85, due to inertial forces, ends to move towards the upper end of the cartridge in the direction of rotation. This results in dislocation of a small amount of toner to provide a viscous drag on arm assembly 84 causing arm 84 to rotate through an angle θ typically between 15° and 30°, from the vertical or six o'clock position. At this time switch device 100 is energized and switch 102 is open, since it is not under the influence of magnet 98. During continued machine operation, the cartridge may be intermittently stopped and started depending upon operating requirements. When the cartridge rotation ceases, arm 84 is prevented from returning to the plumb position because of the viscous drag forces exerted by the toner and because of the configuration and lightness of the arm relative to the tone bed.

Figure 5:
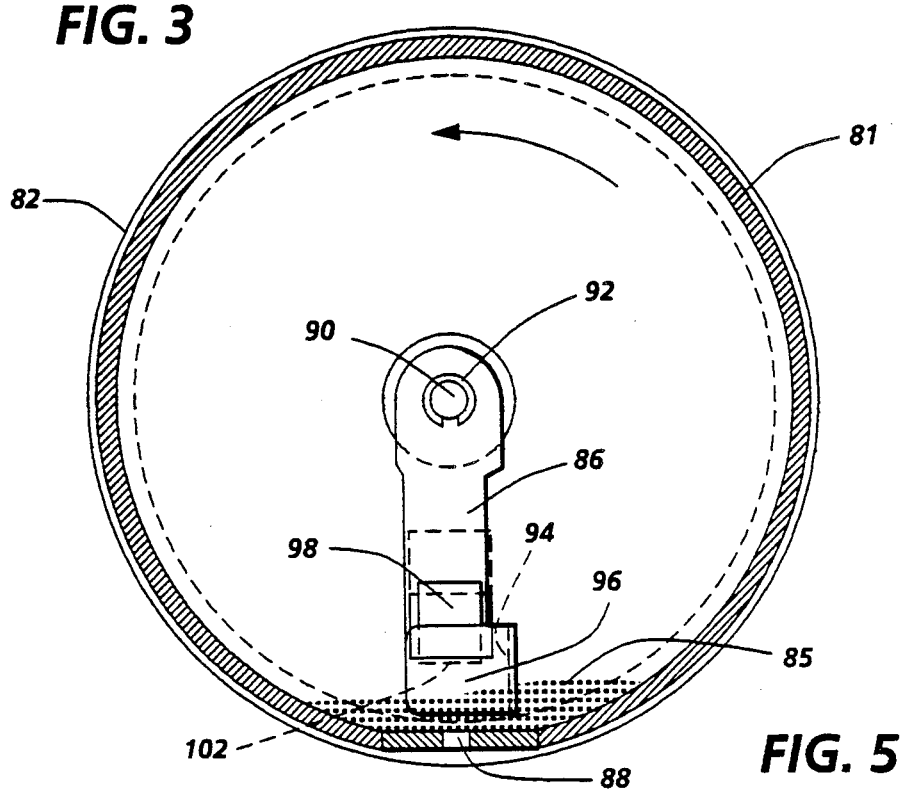
FIGS. 4 and 5 show end views of the toner dispenser during a high toner and low toner level, respectively.

With continued machine operation, the toner level will drop as dispensing continues. As the toner level decrease, the effects of the viscous drag force diminishes and arm 84 assembly gradually moves in a clockwise direction towards the plumb or vertical position. FIG. 5 shows the toner level diminished to the point where the arm assembly 84 is back in the plumb or vertical orientation. (The rotational torque exerted on the arm assembly 84 due to pivot shaft 90 is minimal). At this point, magnet 98 is aligned with switch 102 and exerts sufficient attractive force to close the switch 102. Output signals are produced which can be utilized for a variety of purposes. In the preferred embodiment, a first low level toner display signal is generated by device 100, and is used to activate a visual display on the machine control panel. Simultaneously, a second audible signal is generated activating an acoustic device to provide an audible signal. A counting circuit 106 (FIG. 1), installed in the copy path is enabled at this point, and counts the number of feet of copy paper going through the paper path. After a preselected number of feet are counted, a third signal is generated by circuit 100 which will remove system power and shut the machine down. The machine shut down is selected to occur at a point where the copy density is still at an acceptable level so that installation of a new toner cartridge operation may begin immediately e.g., no light copies are produced.

While the invention has been described with reference to the structure disclosed, it is not confined to the specific details set forth. For example, the location of magnet 98 may be on the outboard surface of arm 84; a differ type of magnetic coupling device such as a Hall effect transistor may be used. Other configurations of arm assembly 84 and paddle member 94 are possible consistent with the requirement that the arm assembly be sufficiently subject to the viscous drag effects of toner rotation so as to be carried with the toner and maintained in position with the toner bed movement. Further while the arm assembly is shown mounted on the central axis of the end wall, it could be mounted anywhere along the cartridge central axis; for example, along a rod which extends along the central axis and connected to both end caps. All such modifications or changes are intended to be covered within the scope of the following claims.

We claim:

1. In a system for dispensing toner particles from a rotatable cylindrical toner cartridge to a developer mixture, a sensing system for detecting a low toner condition within said cartridge, said sensing system comprising:

an arm assembly pivotably mounted within the toner cartridge and on its central axis, said arm assembly including a downwardly extending arm member having a magnet attached thereto, the arm member being at least partially enveloped by the toner within the cartridge, when the cartridge is filled to above a low toner level height, and a switching device adapted to generate an electrical signal when said arm assembly is in a vertical or plumb orientation within the cartridge, said arm assembly adapted to be prevented from attaining said plumb position until the toner level has been depleted to a level low enough to free the arm assembly from viscous drag forces exerted by the toner as it rotates.

2. The system of claim 1 wherein said switching device generates a first signal which is used to energize a visual display indicating a low toner level condition, and a second signal which is used to energize an acoustic device to produce an audible signal indicating a low toner level condition.

3. In a reproduction machine having a movable recording member on which latent electrostatic images are created, developing means for developing the images, and transfer means for transferring the developed images to a coy substrate material, said copy substrate being conveyed along a copy path, the developing means including a developer housing having a sump for a developer mixture for developing the images on the recording member, the developer housing further including a cylindrical toner cartridge having a series of longitudinally extending toner discharge ports; means for periodically rotating said cylinder causing toner contained within the cartridge to be dispensed therefrom into said sump, and further including a low toner level sensing system comprising an arm assembly pivotably mounted on the central axis of said cartridge, said arm assembly including a downwardly extending arm member having a magnetic means secured thereto, said arm member adapted to engage the toner stored therein while the toner is at a relatively high level and to be moved by toner viscous drag forces generated during cartridge rotation to an out of plumb position, said drag forces becoming less as toner is depleted, whereby the arm assembly achieves a plumb position when a sufficiently low toner level is reached, and circuit means actuable by proximity to said magnetic means when said arm member is in said plumb position, said circuit means generating an output signal to activate a visual or audible low toner level display.

4. The machine of claim 3 further including counting means located along said copy path, said counting means adapted to become enabled upon receipt of a low toner signal from said circuit means, said counting means generating a machine shut-off signal after a preselected number of feet of copy have been counted.

5. An apparatus for dispensing toner particles including in combination a cylindrical rotating toner housing having a series of longitudinal toner dispensing ports for a toner supply contained therein, an arm assembly pivotably mounted within the housing on the central axis thereof, said arm assembly including a downwardly extending arm member which attains a plumb position when the toner level falls below a certain low level while maintaining an out of plumb position when toner is above said low level; magnetic means connected to said arm member, said magnetic means enabling a magnetic sensing circuit aligned with said magnetic means when said arm member is in the plumb position.

6. The apparatus of claim 5, further including a low toner level display connected to said magnetic sensing circuit, side display adapted to be energized by a signal generated by said sensing circuit.

7. An apparatus for dispensing toner particles including in combination a cylindrical rotating toner housing having a series of longitudinal toner; dispensing ports for a toner supply contained therein, an arm assembly pivotably mounted within the housing on the central axis thereof, said arm assembly including a downwardly extending arm member the vertical orientation of the arm member being directly proportional to the depth of the toner supply.

8. A toner low level detection or system including in combination,
- a toner cartridge adapted to rotate along its longitudinal axis to dispense toner through a series of dispensing ports at approximately a six o'clock position,
- a magnetically activated switch circuit exterior to one end of said cartridge and in alignment with said six o'clock position,
- a low toner indicating means comprising an arm pivotably mounted within said cartridge, said arm having a magnet located at the suspended end, said magnet creating a force upon said switch means when the arms is in the vertical or plumb position, said force sufficient to actuate said switch circuit whereby a signal is generated which is used to produce a visual or audible signal indication of low toner.

* * * * *